US 12,085,579 B2

(12) United States Patent
Heydlauf

(10) Patent No.: US 12,085,579 B2
(45) Date of Patent: Sep. 10, 2024

(54) MOBILE CONNECTED AUTONOMOUS REFRIGERATOR

(71) Applicant: Siemens Healthcare Diagnostics Inc., Tarrytown, NY (US)

(72) Inventor: Michael Heydlauf, Cary, NC (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/699,137

(22) PCT Filed: Sep. 29, 2022

(86) PCT No.: PCT/US2022/077310
§ 371 (c)(1),
(2) Date: Apr. 5, 2024

(87) PCT Pub. No.: WO2023/064682
PCT Pub. Date: Apr. 20, 2023

(65) Prior Publication Data
US 2024/0264184 A1    Aug. 8, 2024

Related U.S. Application Data

(60) Provisional application No. 63/262,404, filed on Oct. 12, 2021.

(51) Int. Cl.
*G01N 35/00* (2006.01)
*F25D 11/00* (2006.01)
*F25D 25/04* (2006.01)
*G06Q 10/087* (2023.01)

(52) U.S. Cl.
CPC ..... *G01N 35/00663* (2013.01); *F25D 11/003* (2013.01); *F25D 25/04* (2013.01); *G01N 2035/00435* (2013.01); *G01N 2035/00673* (2013.01); *G06Q 10/087* (2013.01)

(58) Field of Classification Search
CPC ... G01N 35/00663; G01N 2035/00435; G01N 2035/00673; G06Q 10/087
See application file for complete search history.

(56) References Cited

U.S. PATENT DOCUMENTS

| | | | |
|---|---|---|---|
| 2012/0109378 A1* | 5/2012 | Kim | G08C 17/00 901/1 |
| 2017/0217027 A1* | 8/2017 | Boucard | B25J 19/023 |
| 2019/0261565 A1* | 8/2019 | Robertson | A01D 46/22 |
| 2020/0209821 A1* | 7/2020 | Heinla | G05B 19/4155 |
| 2021/0116924 A1* | 4/2021 | Etou | G05D 1/0212 |

OTHER PUBLICATIONS

International Search Report and Written Opinion of International Application No. PCT/US2022/077310 dated Jan. 17, 2023.

* cited by examiner

*Primary Examiner* — Kyle O Logan

(57) ABSTRACT

A method and system for replenishing refrigerated consumables by a mobile connected autonomous refrigerator includes receiving a notification triggered by a laboratory instrument that a refrigerated consumable used by the laboratory instrument is depleted; autonomously navigating to a refrigerated storage; retrieving the refrigerated consumable and placing it in the mobile refrigerated unit: autonomously moving to the laboratory instrument that triggered the notification; and alerting an operator to retrieve the refrigerated consumable from mobile refrigerated unit and load it into the laboratory instrument.

20 Claims, 5 Drawing Sheets

MOBILE CONNECTED AUTONOMOUS REFRIGERATOR

CROSS-REFERENCE TO RELATED APPLICATIONS

This application is a 35 U.S.C. 371 national application of international application no. PCT/US2022/077310 filed Sep. 29, 2022, which claims priority of U.S. Provisional application No. 63/262,404 filed Oct. 12, 2021, the contents of which are fully incorporated herein by reference.

BACKGROUND

In the diagnostic laboratory, inventory includes reagents and consumables that are used by instruments to produce test results. Instruments have limited on-board capacity for inventory, so they frequently need to be replenished as inventory is consumed. Reagents must be kept at low temperatures to prevent spoiling, so bulk reagent inventory is kept in a refrigerator.

Laboratory staff members identify when an instrument needs to have its inventory of reagents replenished. This identification can happen through direct observation, a hardware alert (e.g., a flashing light), a software alert (e.g., email, text message, on-screen pop-up, etc), or other means, such as bulk replenishment of all instruments at the start of a shift. When a staff member identifies an instrument in need of replenishment, they create a "shopping list" (the list of inventory items in need of replenishment) either manually (e.g., written down or memorized) or digitally (e.g., printed list or email) and fetch the needed inventory from the bulk refrigerator. At this point they may use a software inventory system to keep track of the refrigerated inventory and "check out" the items being fetched. From there, they manually take and replace the depleted or expired on-board inventory of one or more instruments.

Manually moving reagents from large, refrigerated storage to the diagnostic instruments that utilize them is inefficient and time consuming. Fully automated systems that are capable of both retrieving reagents and loading them into diagnostic instruments are expensive and complicated to design, and may have limited utility.

SUMMARY OF THE EMBODIMENTS

In a first aspect, a method for replenishing refrigerated consumables by a mobile refrigerated unit includes receiving a notification from a laboratory instrument that a refrigerated consumable used by the laboratory instrument is depleted below a threshold level; autonomously navigating to a refrigerated storage, retrieving the refrigerated consumable and placing it in the mobile refrigerated unit; autonomously moving to the laboratory instrument that triggered the notification; and alerting an operator to retrieve the refrigerated consumable from the mobile refrigerated unit and load it into the laboratory instrument.

In an embodiment, the mobile refrigerated unit waits by the laboratory instrument until the refrigerated consumable is removed from the mobile refrigerated unit.

In any of the above embodiment, alerting the operator includes a digital message to the operator or an audible message to the operator.

In any of the above embodiment, the method includes registering an inventory event with an inventory management system when the refrigerated consumable has been removed from the refrigerated storage.

Further, the method includes retrieving the refrigerated consumable from the refrigerated storage further comprises using a robotic arm on the mobile refrigerated unit to move the refrigerated consumable.

In any of the above embodiments, the method of autonomously moving further includes finding a route between the refrigerated storage and the laboratory instrument without real-time human intervention.

In any of the above embodiments, the method further includes receiving a plurality of notifications from two or more laboratory instruments that a refrigerated consumable is depleted; prioritizing the plurality of notifications based on predefined criteria; autonomously navigating to the refrigerated storage and retrieving a plurality of refrigerated consumables corresponding to one or more of the plurality of notifications; autonomously moving to the laboratory instrument sending the notification with a highest priority according to the predefined criteria; alerting an operator to retrieve the refrigerated consumable from mobile refrigerated unit and load it into the laboratory instrument triggering the notification with the highest priority; and autonomously moving to the laboratory instrument with a next highest priority after the operator retrieves the refrigerated consumable for the laboratory instrument with the highest priority.

In a second aspect, a system for replenishing refrigerated consumables used in diagnostic analysis includes a plurality of laboratory instruments performing the diagnostic analysis; a computing device; a refrigerated storage for bulk storage of consumables; and a mobile refrigerated unit including an internal refrigerator; a robotic arm; and at least one processor and a memory communicatively coupled with the processor and memory storing machine-readable instructions that, when executed by the processor, control the processor to: receive a notification from a laboratory instrument that a refrigerated consumable used by the laboratory instrument is depleted; autonomously navigate to a refrigerated storage, retrieve the refrigerated consumable and place it in the mobile refrigerated unit: autonomously move to the laboratory instrument that triggered the notification; and alert an operator to retrieve the refrigerated consumable from the mobile refrigerated unit and load it into the laboratory instrument that triggered the notification.

In embodiments, the system is in a laboratory and the mobile refrigerated unit further comprises one or more sensors for identifying fixtures of the laboratory. Further, autonomously moving includes using the one or more sensors to find a route between the refrigerated storage and the laboratory instrument that triggered the notification.

In any of the above embodiments, the machine-readable instructions control the processor to cause the mobile refrigerated unit to wait by the laboratory instrument that triggered the notification until the refrigerated consumable is retrieved from the internal refrigerator.

In any of the above embodiments, the mobile refrigerated unit further comprises at least one of a display or a speaker providing the alert to the operator.

In any of the above embodiments, the machine-readable instructions control the processor to register an inventory event with an inventory management system when the refrigerated consumable has been removed from the refrigerated storage.

In any of the above embodiments, retrieving the refrigerated consumable from the refrigerated storage further comprises using the robotic arm on the mobile refrigerated unit to move the refrigerated consumable from the refrigerated storage to the internal refrigerator.

In any of the above embodiments, the mobile refrigerated unit further comprises a rechargeable battery and the system further comprises a charging station for receiving the mobile refrigerated unit to recharge the battery.

In any of the above embodiments, the machine-readable instructions control the processor to receive a plurality of notifications from one or more laboratory instruments that a refrigerated consumable is depleted; prioritize the plurality of notifications based on predefined criteria; autonomously navigate to the refrigerated storage and retrieve one or more refrigerated consumables corresponding to the plurality of notifications; autonomously move to the laboratory instrument sending the notification with a highest priority; alert an operator to retrieve the refrigerated consumable from the mobile refrigerated unit and load it into the laboratory instrument sending the notification with the highest priority; and autonomously move to the laboratory instrument sending the notification with a next highest priority after the operator retrieves the refrigerated consumable for the laboratory instrument sending the notification with the highest priority.

In any of the above embodiments, the predefined criteria includes selecting the laboratory instrument with the most depleted quantity of refrigerated consumable as the highest priority notification. Further, the predefined criteria includes at least one of the laboratory instruments with the most depleted refrigerated consumable, the laboratory instrument with the highest load or the laboratory instrument with the most impact on overall workflow.

DETAILED DESCRIPTION OF THE EMBODIMENTS

Figure 1:
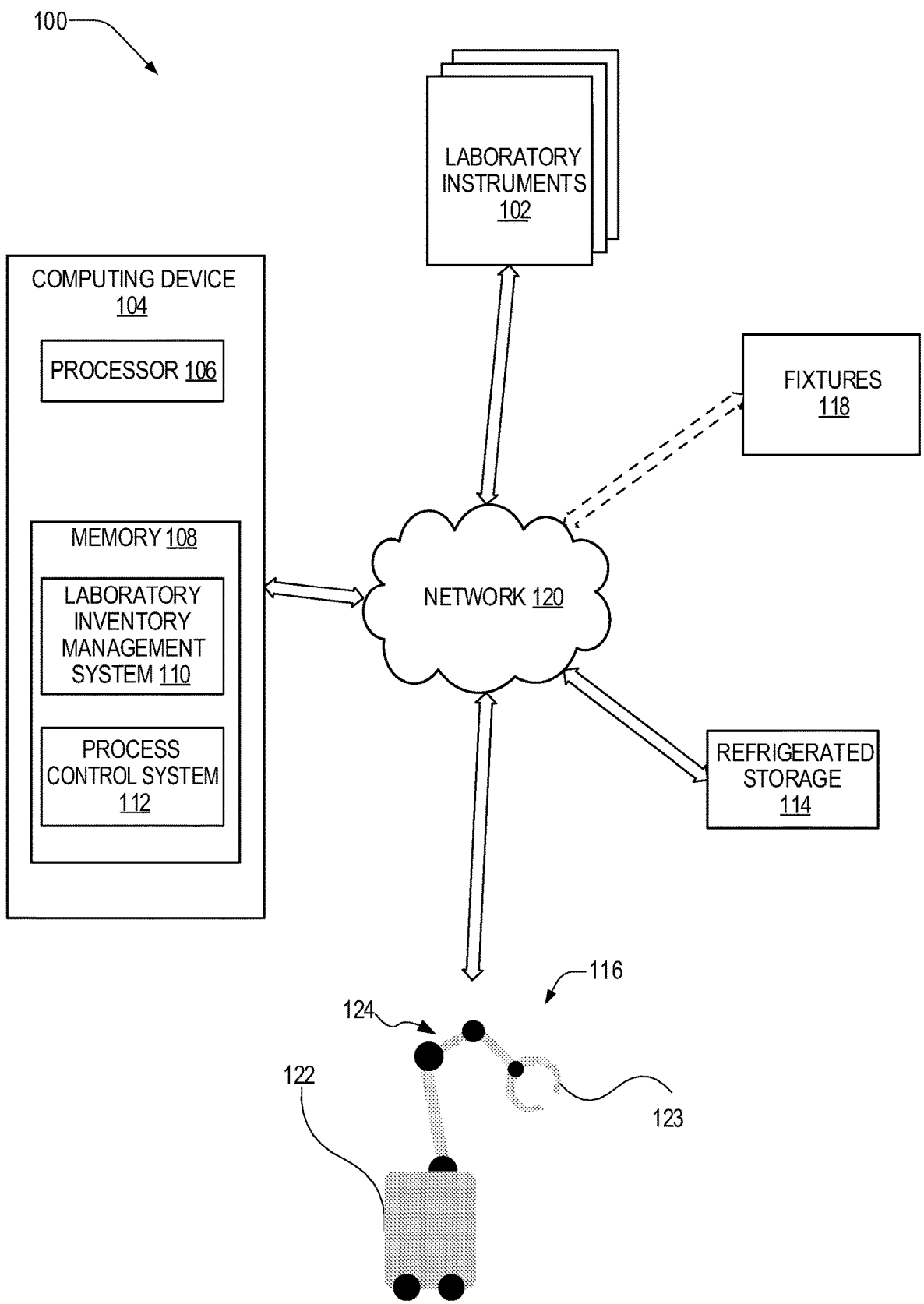
FIG. 1 is a schematic diagram of a laboratory with a mobile connected autonomous refrigerator, in an embodiment.

FIG. 1 is a schematic diagram of a diagnostic laboratory 100 with a mobile connected autonomous refrigerator. Embodiments are described in terms of a diagnostic laboratory and more generally, a laboratory, but discussions herein may be applied to any facility that performs analysis tasks using materials that are consumed during analysis and require climate-controlled storage.

Laboratory 100 may include a plurality of laboratory instruments 102. In embodiments, the laboratory instruments 102 may include sample handlers and sample analyzers for performing a variety of diagnostic tests.

Laboratory instruments 102 may be connected to computing device 104. Computing device 104 may represent at least one processor 106 communicatively coupled to memory 108 which stores machine-readable instructions for execution by processor 106. Computing device 104 may also include other components not shown in FIG. 1, such as a network interface and a user interface. Both laboratory instruments 102 and computing device 104 are connected to network 120 for communicating data and control information.

Memory 108 includes Laboratory Inventory Management System (LIMS) 110 and process control system 112. In embodiments, LIMS 110 generally includes control functions for managing laboratory inventory such as available reagent supply, and its location, inventory orders in process, and/or on-board instrument inventory. Process control system 112 generally includes control functions for laboratory automation and analytics. Although two components of memory 108 are shown this is for purposes of illustration; processes described herein may be divided differently or combined in one software component. Further computing device 104 may refer to one or more computing devices physically present in laboratory 100 or in a cloud processing environment. Network 120 may refer to a local network such as a WAN or LAN, or the Internet.

Refrigerated storage 114 stores bulk reagents and consumables in inventory cartridges for use by laboratory instruments 102 that must be kept at low temperatures to prevent spoiling. Refrigerated storage 114 is also connected to network 120.

Mobile Connected Autonomous Refrigerator (MCAR) 116 is a mobile refrigerated unit that is used to move reagents and consumables from refrigerated storage 114 to laboratory instruments 102. MCAR 116 includes an internal refrigerator 122 and a robotic arm 124. Robotic arm 124 is supported on internal refrigerator 122 at one end, while the other end may culminate in one or more devices useful for manipulating objects. Although a gripping device 123 is shown in FIG. 1, this is for purposes of illustration only. Many different types of robotically controllable devices are contemplated.

Computing device 104 receives notifications from laboratory instruments 102 indicating that reagents or consumables used by the instrument during analysis are or will soon be depleted below a threshold level, or are or will soon become expired, and need to be replaced. When a notification is received, MCAR 116 is caused to autonomously move to refrigerated storage 114 and use robotic arm 124 to retrieve a new supply of the depleted reagent from refrigerated storage 114 and place it in internal refrigerator 122. MCAR 116 is then caused to move to laboratory instrument 102 that triggered the notification. In embodiments, a notification may be sent directly to MCAR 116, or some or all of computing device 104 may be incorporated in MCAR 116. In embodiments, MCAR 116 includes a rechargeable battery and may be docked in a charging station (not shown) when not in use.

Laboratory 100 may also include other fixtures 118 that support the functions of the laboratory 100, such as pre- and post-analytical modules, sample tube handlers and sorters, desks, cabinets, etc. These fixtures may or may not be connected to network 120.

Figure 2:
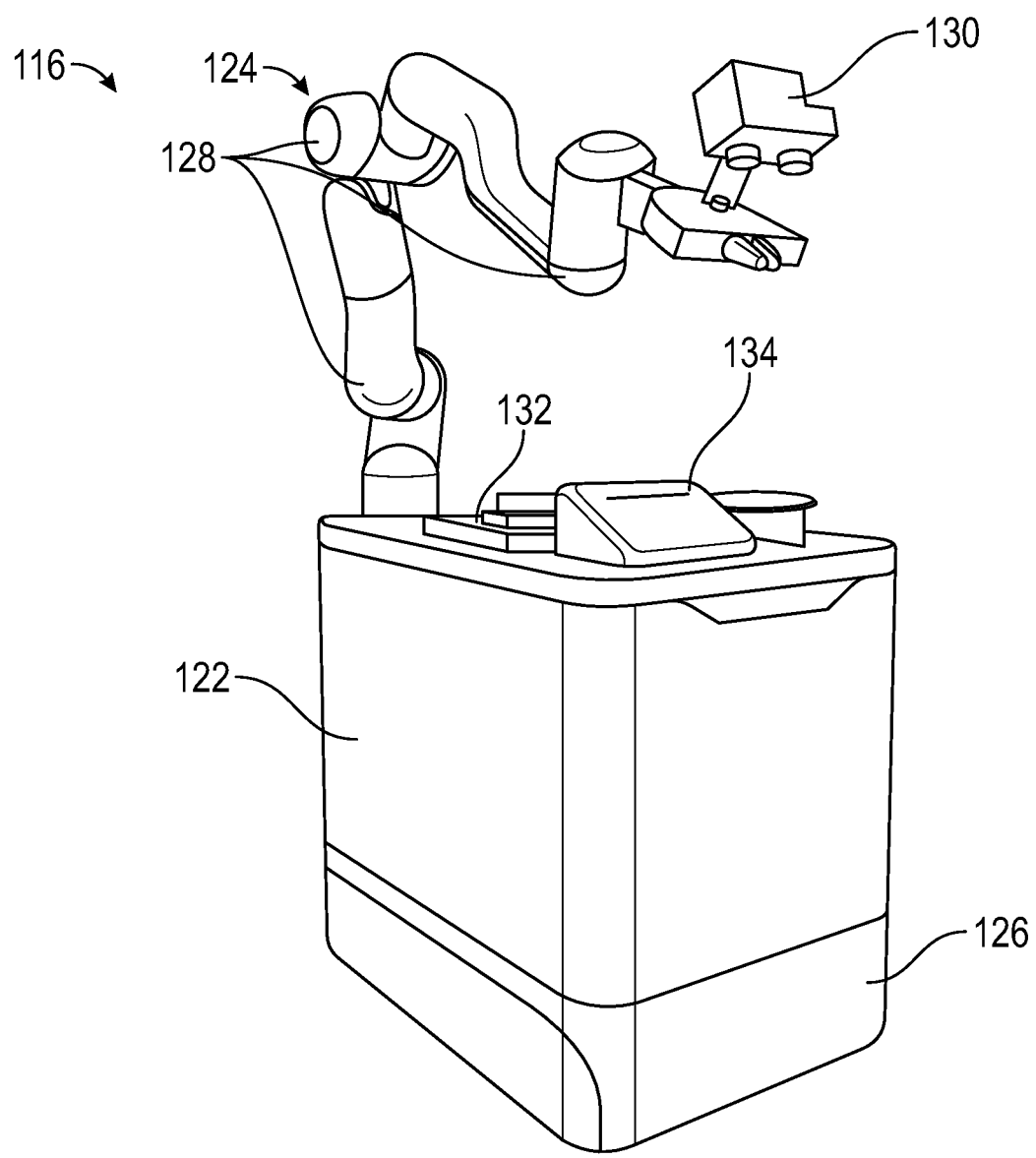
FIG. 2 is a more detailed view of the mobile connected autonomous refrigerator of FIG. 1, in embodiments.

FIG. 2 is a more detailed view of MCAR 116, in embodiments. Although a structure and design for MCAR 116 is depicted in FIG. 2, this is not limiting, and various changes may be made without departing from the embodiments discussed herein. Internal refrigerator 122 may be mounted on base 126 of MCAR 116. Base 126 includes one or more components for moving MCAR 116 around laboratory 100. These components may be wheels or belts, for example, and motors for operating the components. Although not depicted in FIG. 2, MCAR 116 also includes a processor and a memory communicatively coupled with the processor, for storing machine-readable instructions that, when executed by the processor, control the operation of MCAR 116.

Robotic arm 124 may include more than one segment connected by joints 128. Any number of segments and joints 128 may be provided in robotic arm 124 as needed to retrieve reagents from refrigerated storage 114 and place them in internal refrigerator 122. Joints 128 may provide linear or rotational movement. In embodiments, robotic arm 124 may also rotate in a horizontal plane around MCAR 116.

Robotic arm 124 may also include sensors 130, such as a camera or infrared sensor, for example. Sensors 130 are used to identify refrigerated storage 114, laboratory instruments 102 and other fixtures 118 so that MCAR 116 may autonomously move around laboratory 100. Robotic arm 124 may also include various gripping devices for manipulating objects.

Internal refrigerator 122 may include a portal 132 for placing objects into or removing objects from internal refrigerator, whether by robotic arm 124 or a human operator. Internal refrigerator 122 may also be provided with doors or other access points on the front or sides of MCAR 116. A user interface 134 with a display and keyboard may be used by an operator to register removal of a reagent from internal refrigerator 122 and/or refrigerated storage 114, or perform other operations for controlling MCAR 116.

Figure 3:
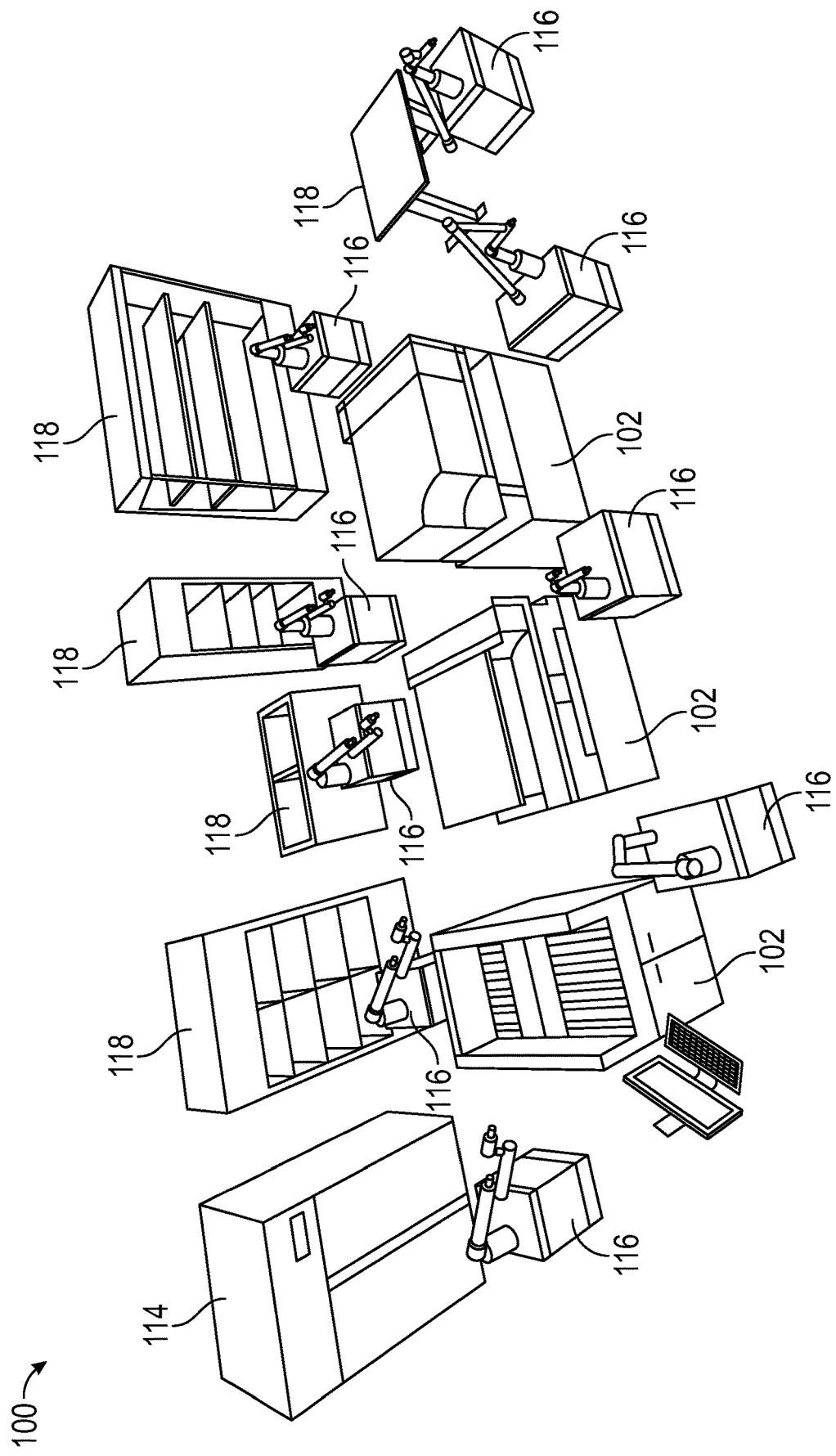
FIG. 3 is a more detailed perspective diagram of the laboratory of FIG. 1, in embodiments.

FIG. 3 is a more detailed perspective diagram of laboratory 100 of FIG. 1, in embodiments. The type and arrangement of fixtures shown in FIG. 3 is for purposes of illustration only. More, less or different fixtures appropriate for use in a laboratory may also be used in accordance with the principles discussed herein. A plurality of laboratory instruments 102 may be positioned in a row for convenient access. Although shown separated by a space, laboratory instruments 102 may be next to each other to provide improved sample handling. Other arrangements of laboratory instruments are also contemplated. Refrigerated storage 114 is located in another area of laboratory 100 and positioned for convenient access by MCAR 116. Other fixtures 118 such as shelves and tables are also present in laboratory 100. Fixtures 118 may or may not be accessed by MCAR 116.

For purposes of illustration, multiple representations of MCAR 116 are shown. These representations feature different orientations and robotic arm positions to illustrate the flexible movement achievable by MCAR 116. In embodiments, laboratory 100 may use a single or more than one MCAR 116 as long as computing device 104 is capable of distinguishing between them. MCAR 116 is capable of navigating around laboratory 100 autonomously. This can be achieved through sensing equipment (e.g., LIDAR, radar, cameras, GPS, IPS, etc) coupled with path finding and collision avoidance algorithms and with or without path hints placed on or near the laboratory floor.

Figure 4:
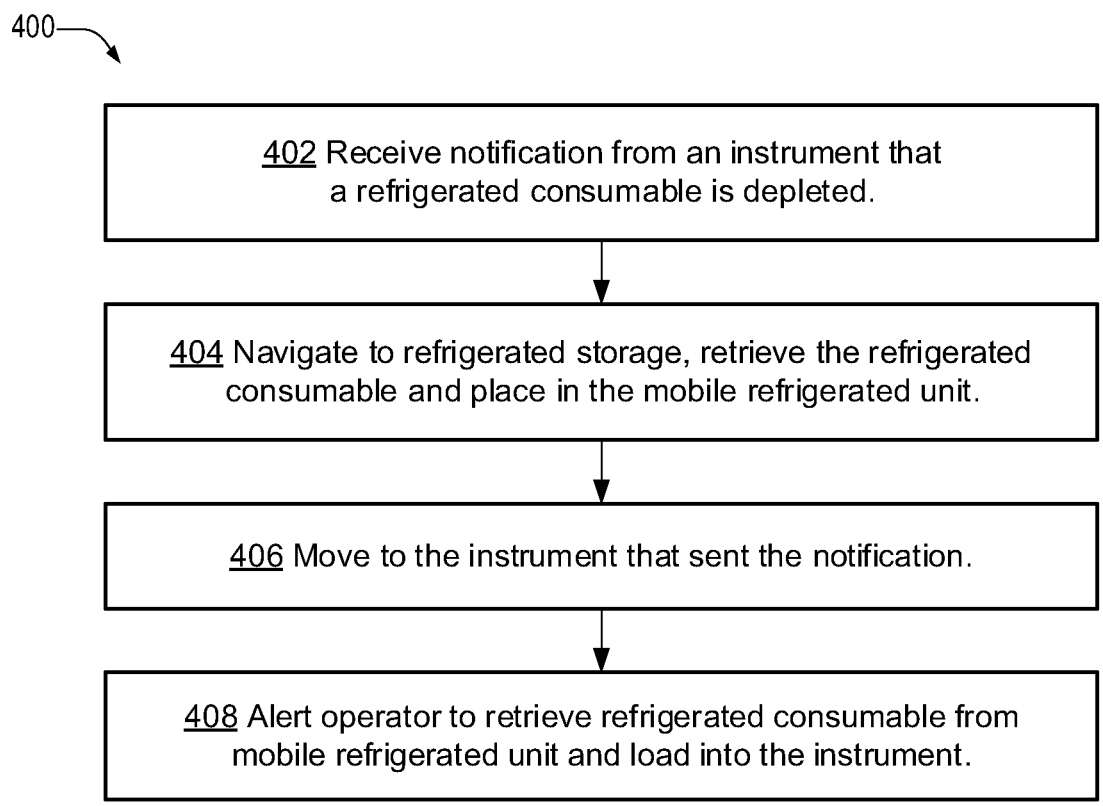
FIG. 4 is a flowchart illustrating a method for replenishing refrigerated consumables using a mobile connected autonomous refrigerator of FIG. 2, in embodiments.

FIG. 4 is a flowchart illustrating a method 400 for replenishing refrigerated consumables using a mobile connected autonomous refrigerator of FIG. 2.

Step 402 includes receiving a notification from an instrument that a refrigerated consumable is depleted below a threshold level. In an example of step 402, laboratory instruments 102 use reagents and consumables to produce test results from samples. Laboratory instruments 102 have limited on-board capacity for an inventory of reagents, so they frequently need to be replenished as that inventory is consumed. When a laboratory instrument 102 detects that a reagent is about to be depleted, it sends a notification to either computing device 104 or MCAR 116.

Step 404 includes autonomously navigating to a refrigerated storage, retrieving the necessary refrigerated inventory and placing it in the mobile refrigerated unit. Reagents must be kept at low temperatures to prevent spoiling, so bulk reagent inventory is kept in a refrigerator. In an example of step 404, MCAR 116 autonomously navigates to refrigerated storage 114 then uses robotic arm 124 to retrieve the refrigerated inventory and place it in the internal refrigerator of the mobile refrigerated unit. Autonomous navigation means that MCAR 116 can path-find a suitable route from its current location such as a charging station to refrigerated storage 114 without remote, real-time human intervention. Similarly, MCAR 116 can open and close refrigerated storage 114 and retrieve inventory items to load in its internal refrigerator 122. In embodiments, MCAR 116 interfaces with LIMS 110 to register the inventory event.

Step 406 includes autonomously moving to the instrument that triggered the notification. In an example of step 406, MCAR 116 can path-find a suitable route from refrigerated storage 114 to laboratory instrument(s) 102 without remote, real-time human intervention.

Step 408 includes alerting an operator to retrieve the refrigerated inventory from mobile refrigerated unit and load it into the instrument. In an example of step 408, once MCAR 116 reaches a position next to or near the instrument that triggered the notification and waits for a human operator to perform the last step: replacing the depleted refrigerated inventory with the freshly retrieved inventory. While waiting the system may display a hardware alert notifying nearby personnel that action is required. A hardware alert may include one or both of a digital message and an audible message from user interface 134. An alert may also include a digital message sent directly to an operator such as a text message, for example. A speaker or MCAR 116 may also provide an audio alert.

Method 400 offers some advantages over "fetch and replace" systems due to the technical hurdles the latter systems face. "Fetch and replace" is a generic term for autonomous robots capable of the tasks of both fetching inventory and placing it in its final location, such as loading it onto a shelf or in an instrument. Training of a "fetch and replace" system is far more arduous as each laboratory instrument 102 may have different means by which their on-board inventory is accessed, different software steps required to pause the instrument, far more nimbler degrees of motion required for robotic arm 124 to access the instrument inventory storage, etc. In embodiments disclosed herein, these technical hurdles are avoided by using on-board refrigerated storage and human intervention. In this way, the autonomous training can be focused on the much easier and more generalized steps of path-finding and bulk refrigeration retrieval. Internal refrigerator 122 allows inventory items to be safely stored while waiting to be loaded on laboratory instrument(s) 102.

Figure 5:
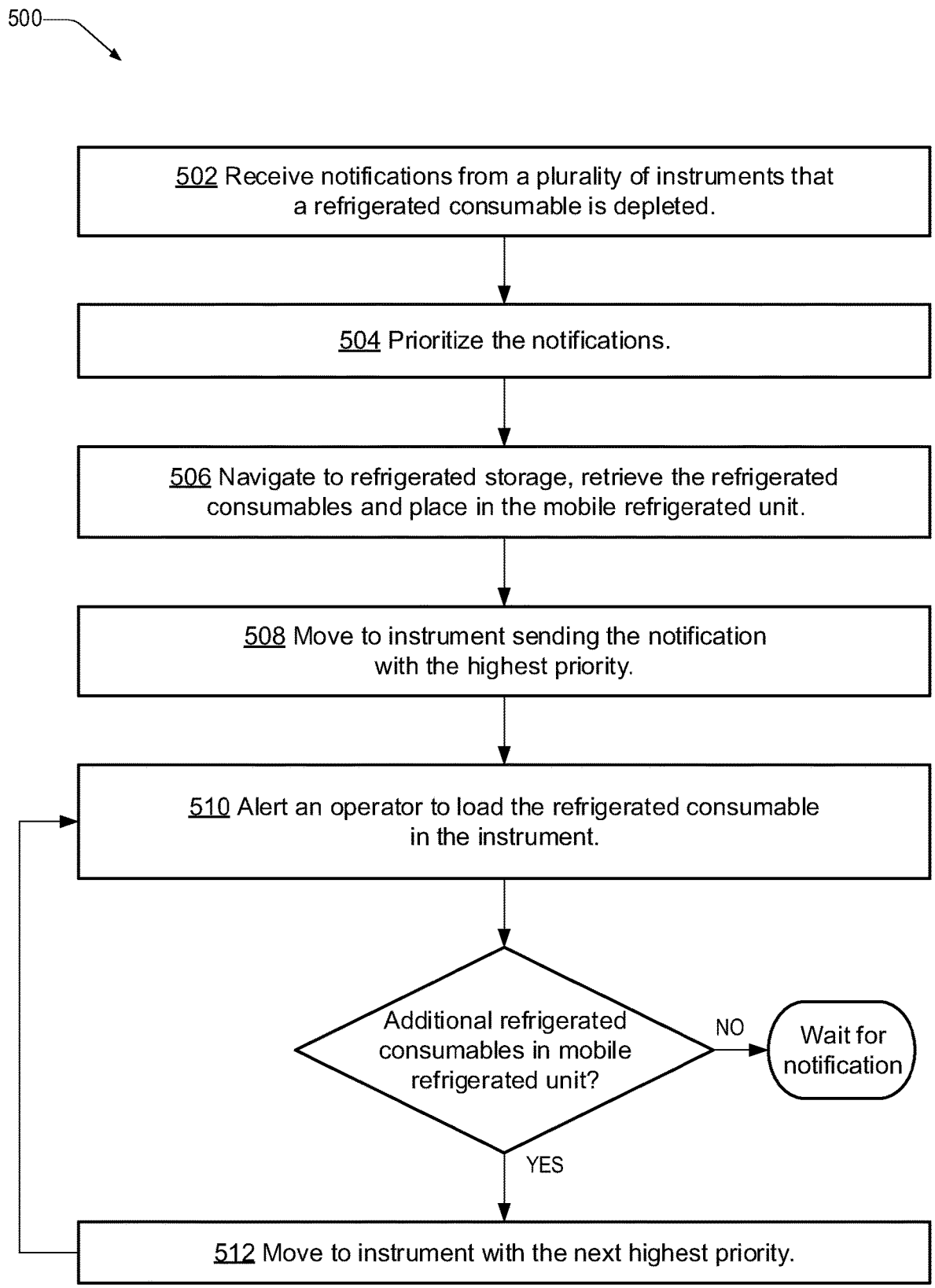
FIG. 5 is a flowchart illustrating a method for replenishing refrigerated consumables in several laboratory instruments, in embodiments.

FIG. 5 is a flowchart illustrating a method 500 for replenishing refrigerated consumables in several laboratory instruments, in embodiments.

Step 502 includes receiving a plurality of notifications from one or more laboratory instruments that a refrigerated consumable is depleted below a threshold level. In an example of step 502, more than one laboratory instrument 102 may send a notification that a refrigerated consumable is depleted below a threshold level. The threshold level may be selected by an operator.

Step 504 includes prioritizing the plurality of notifications based on predefined criteria. In an example of step 504, the predefined criteria may include identifying the laboratory instrument 102 with the most depleted quantity of refrigerated consumable as the highest priority notification. In embodiments, the predefined criteria may include ranking laboratory instruments 102 based on which one has the highest load, i.e., their current number of samples waiting to be processed, or their impact on the overall workflow, i.e., their tendency to create a bottleneck. Other criteria instead of or in addition to those described above are contemplated.

Step 506 includes autonomously navigating to the refrigerated storage, retrieving a plurality of refrigerated consumables corresponding to the plurality of notifications. In an example of step 506, MCAR 116 autonomously navigates to refrigerated storage 114 then uses robotic arm 124 to retrieve the refrigerated consumable and place it in the internal refrigerator of the mobile refrigerated unit.

Step 508 includes autonomously moving to the laboratory instrument sending the notification with a highest priority. In an example of step 508, MCAR 116 moves to laboratory instrument 102 that was identified according to predefined criteria as having the highest priority.

Step 510 includes alerting an operator to retrieve the refrigerated consumable from mobile refrigerated unit and load it into the laboratory instrument. In an example of step 510, once MCAR 116 reaches a position next to or near the instrument that triggered the notification and waits for a human operator to replace the depleted refrigerated consumable with the freshly retrieved inventory.

Step 512 includes autonomously moving to the instrument with the next highest priority after the operator retrieves the refrigerated consumable for the laboratory instrument with the highest priority. In an example of step 512, if there are additional refrigerated consumables in internal refrigerator 122, MCAR 116 moves to laboratory instrument 102 that was identified according to predefined criteria as having the next highest priority. In embodiments, method 500 returns to step 510, alerts an operator then moves to the laboratory instrument 102 with the next highest priority until all of the refrigerated consumables retrieved in step 506 are loaded onto laboratory instruments. When there are no more refrigerated consumables in internal refrigerator 122 to be delivered, MCAR 116 waits for further notifications. In embodiments, MCAR 116 may return to a charging station while waiting for notifications.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary." means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for replenishing refrigerated consumables by a mobile refrigerated unit, comprising:
   receiving a notification from a laboratory instrument that a refrigerated consumable used by the laboratory instrument is depleted below a threshold level;
   autonomously navigating to a refrigerated storage, retrieving the refrigerated consumable and placing it in the mobile refrigerated unit;
   autonomously moving to the laboratory instrument that triggered the notification; and
   alerting an operator to retrieve the refrigerated consumable from the mobile refrigerated unit and load it into the laboratory instrument.

2. The method of claim 1, wherein the mobile refrigerated unit waits by the laboratory instrument until the refrigerated consumable is removed from the mobile refrigerated unit.

3. The method of claim 1, wherein alerting comprises a digital message to the operator.

4. The method of claim 1, wherein alerting comprises an audible message to the operator.

5. The method of claim 1, further comprising:
   registering an inventory event with an inventory management system when the refrigerated consumable has been removed from the refrigerated storage.

6. The method of claim 1, wherein retrieving the refrigerated consumable from the refrigerated storage further comprises using a robotic arm on the mobile refrigerated unit to move the refrigerated consumable.

7. The method of claim 1, wherein autonomously moving further comprises:
   finding a route between the refrigerated storage and the laboratory instrument without real-time human intervention.

8. The method of claim 1, the method further comprising:
   receiving a plurality of notifications from two or more laboratory instruments that a refrigerated consumable is depleted;
   prioritizing the plurality of notifications based on predefined criteria;
   autonomously navigating to the refrigerated storage and retrieving a plurality of refrigerated consumables corresponding to one or more of the plurality of notifications;
   autonomously moving to the laboratory instrument sending the notification with a highest priority according to the predefined criteria;
   alerting an operator to retrieve the refrigerated consumable from mobile refrigerated unit and load it into the laboratory instrument triggering the notification with the highest priority; and
   autonomously moving to the laboratory instrument with a next highest priority after the operator retrieves the refrigerated consumable for the laboratory instrument with the highest priority.

9. The method of claim 8, wherein the predefined criteria comprises selecting the laboratory instrument with the most depleted quantity of refrigerated consumable as the highest priority notification.

10. The method of claim 8, wherein the predefined criteria comprises at least one of the laboratory instruments with the most depleted refrigerated consumable, the laboratory instrument with the highest load or the laboratory instrument with the most impact on overall workflow.

11. A system for replenishing refrigerated consumables used in diagnostic analysis, comprising:
    a plurality of laboratory instruments performing the diagnostic analysis;
    a computing device;
    a refrigerated storage for bulk storage of consumables; and
    a mobile refrigerated unit comprising:
      an internal refrigerator;
      a robotic arm; and
      at least one processor and a memory communicatively coupled with the processor and memory storing machine-readable instructions that, when executed by the processor, control the processor to:

receive a notification from a laboratory instrument that a refrigerated consumable used by the laboratory instrument is depleted;

autonomously navigate to a refrigerated storage, retrieve the refrigerated consumable and place it in the mobile refrigerated unit;

autonomously move to the laboratory instrument that triggered the notification; and alert an operator to retrieve the refrigerated consumable from the mobile refrigerated unit and load it into the laboratory instrument that triggered the notification.

12. The system of claim 11, wherein the system is in a laboratory and the mobile refrigerated unit further comprises one or more sensors for identifying fixtures of the laboratory.

13. The system of claim 12, wherein autonomously moving further comprises:

using the one or more sensors to find a route between the refrigerated storage and the laboratory instrument that triggered the notification.

14. The system of claim 11, wherein the machine-readable instructions control the processor to cause the mobile refrigerated unit to wait by the laboratory instrument that triggered the notification until the refrigerated consumable is retrieved from the internal refrigerator.

15. The system of claim 11, wherein the mobile refrigerated unit further comprises at least one of a display or a speaker providing the alert to the operator.

16. The system of claim 11, wherein the machine-readable instructions control the processor to register an inventory event with an inventory management system when the refrigerated consumable has been removed from the refrigerated storage.

17. The system of claim 11, wherein retrieving the refrigerated consumable from the refrigerated storage further comprises using the robotic arm on the mobile refrigerated unit to move the refrigerated consumable from the refrigerated storage to the internal refrigerator.

18. The system of claim 11, wherein the mobile refrigerated unit further comprises a rechargeable battery and the system further comprises a charging station for receiving the mobile refrigerated unit to recharge the battery.

19. The system of claim 11, wherein the machine-readable instructions control the processor to:

receive a plurality of notifications from one or more laboratory instruments that a refrigerated consumable is depleted;

prioritize the plurality of notifications based on predefined criteria;

autonomously navigate to the refrigerated storage and retrieve one or more refrigerated consumables corresponding to the plurality of notifications;

autonomously move to the laboratory instrument sending the notification with a highest priority;

alert an operator to retrieve the refrigerated consumable from the mobile refrigerated unit and load it into the laboratory instrument sending the notification with the highest priority; and autonomously move to the laboratory instrument sending the notification with a next highest priority after the operator retrieves the refrigerated consumable for the laboratory instrument sending the notification with the highest priority.

20. The system of claim 19, wherein the predefined criteria comprises selecting the laboratory instrument with the most depleted refrigerated consumable as the highest priority notification.

* * * * *